Jan. 17, 1961  J. BRINN  2,968,299
IGNITION CONTROL
Filed Feb. 20, 1959  2 Sheets-Sheet 1

INVENTOR.
Jule Brinn
BY
Robert B. Gerhardt
ATTORNEY

United States Patent Office 2,968,299
Patented Jan. 17, 1961

2,968,299

IGNITION CONTROL

Jule Brinn, Oak Park, Mich., assignor to General Motors Corporation, Detroit, Mich., a corporation of Delaware Filed Feb. 20, 1959, Ser. No. 794,582

12 Claims. (Cl. 123—198)

This invention relates to internal combustion engine ignition control apparatus and more particularly to ignition control for minimizing the effect of torsional vibrations on power transmission elements in drive trains having internal combustion engines as the power source.

There are many vibration problems connected with the use of internal combustion engines, especially those utilized in motor vehicles. These vibrations are of various forms and this invention relates to controlling one of these forms particularly torsional vibrations. Normally where an internal combustion engine is connected through a propeller shaft to a load, such as the rear axle of a motor vehicle, the conventional propeller shaft is relatively torsionally rigid and, hence, has a very high natural resonant frequency. Where a rigid power shaft is used, forced torsional vibrations caused by forces in the internal combustion engine acting on the crankshaft to oscillate it as a rigid non-flexible member, never approach the natural frequency of these rigid shafts or at most are high order low force and amplitude vibrations that are easily balanced by simple small harmonic vibration balancers.

The foregoing is not true where a relatively long and than flexible power shaft is utilized to transmit engine power to a rear mounted transmission such as that shown and described in S.N. 676,094, filed August 5, 1957, in the name of John Z. DeLorean, entitled "Power Shaft." A shaft of this type may have a relatively low natural torsional resonant frequency, for example 600 cycles per minute, and as will be explained below, there are some engine conditions which produce forced torsional vibrations near or at this value which can result in an undesirable relatively large torsional oscillation of the shaft. If the engine does not have a conventional large inertia flywheel, but utilizes the shaft itself as part of a dynamic flywheel such as that proposed in S.N. 684,892, filed September 19, 1957, in the names of Hulki Aldikacti and Fred J. Timpner, entitled "Dynamic Vibration Absorber," the flywheelless engine will have a relatively small inertia and, hence, will have rapid angular acceleration and deacceleration characteristics, and any forced vibration acting on the engine and power shaft system will cause a relatively large amplitude of torsional oscillation.

One condition under which such a forced vibration equal to the natural frequency of the shaft can occur is in the case of an eight cylinder engine having one cylinder misfiring. This results in a different torque pulse being applied to the shaft every time the misfire occurs, or once every two revolutions of the engine since in a four cycle engine each cylinder fires once every two revolutions. Where the engine is rotating at 1200 r.p.m. this forced vibration occurring once every other revolution will have a frequency of 1200 divided by 2, or 600 cycles per minute or a frequency equal to the natural frequency of the flexible shaft used in the example. Such a misfire condition, while not normal, can occur in high compression multi-cylinder engines without being readily apparent to the vehicle operator. If the engine is operating at the 1200 r.p.m. speed and a flexible power shaft having a natural frequency of 600 cycles per minute is being used to transmit the power from the engine to the drive wheels, then the shaft will be excited by relatively large forces at the shafts natural frequency and the system including the engine, drive shaft and input masses of the rear mounted transmission will be subjected to a first order torsional vibration with a node somewhere on the shaft depending on the relative inertias of the engine and the input masses of the transmission. This vibration will build up rapidly since at its natural frequency the shaft has no resistance to such a forced vibration. Under such conditions it has been found that the amplitude of the torsional oscillation will be as much as 60° or more and the variation in torque loads imposed on the shaft will build up to as high as 3 or 4 times the maximum engine torque, or in the case of a modern motor vehicle engine as high as 800 to 1,000 ft. lbs. This condition results in very high stresses in the relatively small diameter shaft and also results in vibrations transferred to the vehicle itself that are objectionable to the occupants of the vehicle.

It is therefore an object of the invention to provide means for changing the frequency of forced vibration imposed on the shaft by a misfiring engine.

It is a further object of the invention to provide an automatic ignition control wherein under certain conditions the frequency of misfire and, hence, exciting vibration imposed on the shaft is automatically doubled.

It is still another object of the invention to provide an ignition control that will operate only upon the occurrence of torsional oscillations of the system greater than a predetermined amount.

These and other objects and advantages will be apparent from the following description and drawings in which:

Figure 4a shows the voltage curve of the generator of Figure 4;

Figure 4b shows the voltage curve of the generator after passing through a condenser to remove the D.C. component.

Briefly, the invention provides for changing the excitation frequency imposed on the system including the flexible drive shaft by doubling the same. This can be accomplished by causing the excitation to occur at the same point every crankshaft revolution instead of every other revolution of the shaft. Two illustrative methods are shown for effecting this desired result. Both methods act to prevent firing in the cylinder that normally fires one engine revolution later than the original misfire. The first illustrative system utilizes a torsional pendulum connected to the distributor shaft or other element rotating in timed relationship to the engine crankshaft. The pendulum is operable upon distributor shaft torsional oscillations greater than a predetermined amplitude to short the breaker points in the primary circuit of the ignition and thereby act to prevent firing of the proper cylinder. As will be seen the phase characteristics of a torsional pendulum automatically provide for misfiring the proper cylinder to obtain the desired results.

The other method illustrated utilizes the inherent properties of a direct current generator driven by the distributor shaft to provide the proper timing and phasing. This illustrative system utilizes the voltage output of the D.C. generator to control a semi-conductor variable resistance element such as a controlled rectifier that in turn acts to short the ignition at the proper time.

Figure 2:
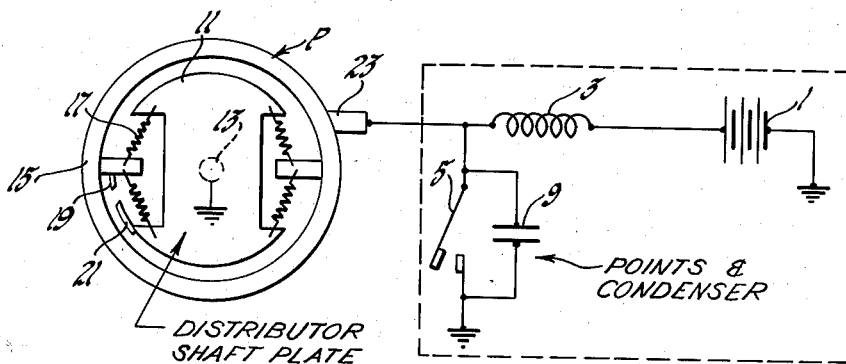
Figure 2 is a schematic illustration of one form of the invention utilizing a torsional pendulum device.

Referring now to Figure 2 which schematically shows the first form of the invention, the area enclosed within the dashed lines represents a conventional low voltage primary circuit of an internal combustion engine ignition system. 1 is the battery, 3 the primary coil of the conventional ignition coil, 5 represents the breaker points or switch which is operated by the distributor cam, not shown, in conventional manner. 9 represents the conventional condenser which serves to prevent arcing across the breaker points when they open to allow the electromagnetic field in the primary coil 3 to collapse. Upon collapse of the magnetic field in the primary coil, high voltage is induced in the conventional secondary coil, not shown, and is directed to the proper spark plug by the distributor rotor and individual spark plug leads, also not shown. Other conventional distributor components such as spark advance and retard devices would be used but for clarity are not shown since they form no part of the invention.

Figure 1:
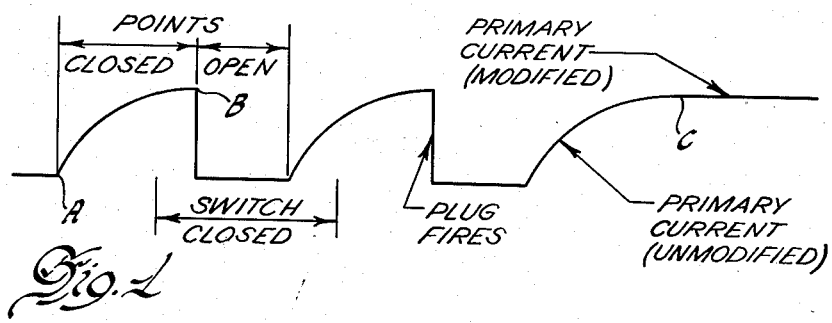
Figure 1 illustrates the current flow curve in the primary coil of a conventional ignition coil as controlled by the ignition distributor cam and breaker points.

The current flow in the primary circuit of the ignition is represented in Figure 1 where point A represents the closing of the breaker points 5. The current flow builds up until at point B the distributor cam opens the points 5, whereupon the current flow drops to zero causing the magnetic field to collapse and induce high voltage current flow in the secondary winding of the coil.

A torsional pendulum, generally designated P, includes an inner member 11 connected to rotate with the distributor shaft 13. This inner rotor may be driven by another element whose speed varies with the engine speed and which partakes in torsional oscillations in phase with those of the crankshaft. An annular inertia weight 15 rotatably mounted in any suitable manner is connected to the rotor member 11 by means of calibrated springs 17. The weight 15 and springs 17 are chosen so that the torsional pendulum has the same natural frequency as the drive shaft. A switch contact 19 is carried by the outer weight 15 and a similar contact 21 is carried by the inner rotor 11 which is electrically connected by the distributor shaft 13 to the vehicle electrical ground. A brush 23 continually connects the outer weight 15 to the primary coil.

Figure 3:
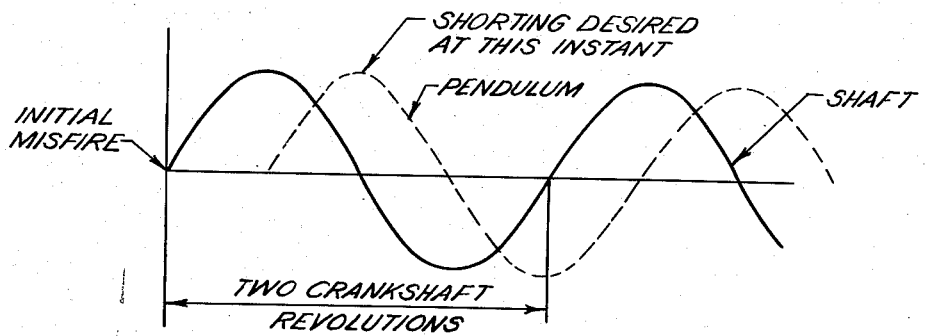
Figure 3 is a view showing the phase relationship between the torsional oscillation in the system and the oscillation of the torsional pendulum of Figure 2.

The distributor shaft 13 and inner rotor 11 rotate the engine crankshaft and partake in the same torsional oscillations as the crankshaft. If the connections, including gearing and distributor shaft, are relatively rigid the oscillations of the rotor 11 will be in phase with that of the crankshaft. The oscillation of the crankshaft and distributor shaft is shown in the solid line in Fig. 3. The inertia weight 15 lags in its movement due to the inherent characteristics of the sprung mass and reaches its maximum amplitude of oscillation 90° of oscillation later than the inner rotor or one-half engine revolution later than the crankshaft reaches its maximum amplitude. This is seen by the broken line curve in Fig. 3. The weight 15 will have its maximum amplitude of oscillation or movement relative to the shaft 13 when the shaft 13 is at maximum velocity or zero acceleration. Since the maximum amplitude of oscillation of the crankshaft occurs 90° or one-half engine revolution later than the original misfire that created the oscillation, any new deliberate misfire will be 180° later or one full engine revolution later.

If the amplitude of oscillation of the inertia weight 15 becomes sufficiently large, the switch points 19 and 21 will contact and short the primary coil 3 to the ignition ground. Opening of the main breaker points 5 will then have no effect and the current flow in the primary coil will continue as shown as point C in Fig. 1.

With the inertial apparatus acting to prevent ignition one revolution later than the original misfire, the frequency of vibration will be doubled and in the example will be at 1200 r.p.m. or twice that of the natural or resonant frequency of the flexible drive shaft. At this high frequency the drive shaft acts as a relatively stiff shaft and the amplitude of oscillation will be reduced to a fraction of the original amplitude at the lower frequency and the switch 19—21 will not operate. If the original cylinder continues to misfire the amplitude of oscillation will again build up to the point where switch 19—21 shorts out the second cylinder. The extent of movement of weight 15 relative to the rotor 11 necessary to actuate the switch 19—21 will determine the maximum oscillation that will occur and this would normally be set to at safe non-objectionable level.

Figure 4:
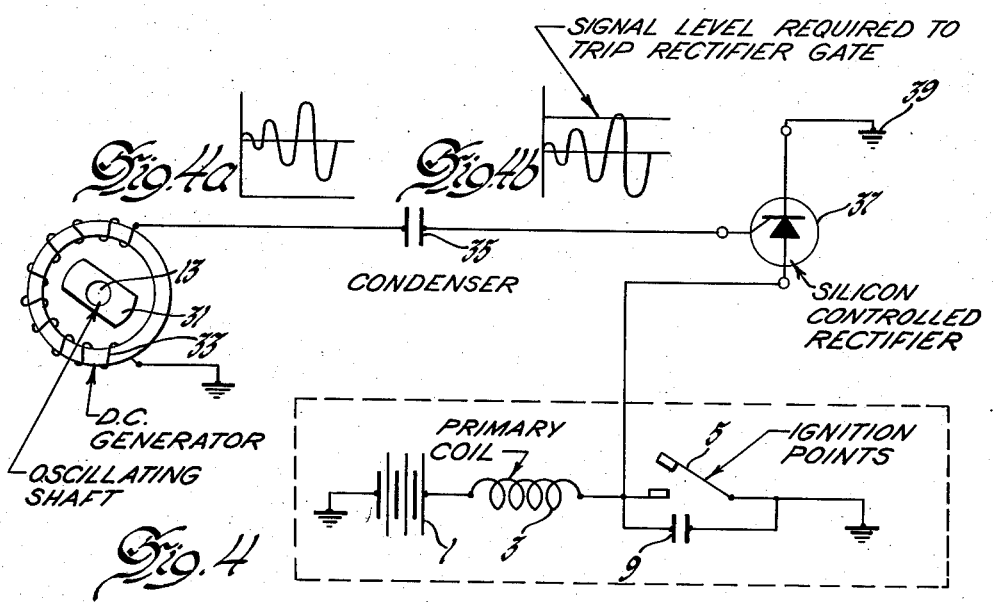
Figure 4 is another form of the invention utilizing an electrical generator device.

Figure 4 shows an alternative system using a D.C. generator to control the proper shorting. This system is entirely electrical. A permanent magnet armature 31 is mounted at some convenient location on the distributor shaft 13 and rotates therewith within a field coil 33. The armature 31 and coil 33 form a D.C. generator and provide a voltage and current flow that varies with the engine and distributor shaft speed. The D.C. generator may be driven by some other member whose speed varies with the engine speed and which is sensitive to the same oscillations as the engine shaft. If the engine rotates at a uniform speed, the electrical output of the generator 31—33 will be constant. If the crankshaft and, hence, distributor shaft have a varying speed such as occurs during the oscillations caused by a misfiring cylinder, the voltage output of the D.C. generator will also vary in the same manner but will be 90° out of phase of with the shaft oscillation since such a device as the D.C. generator has a current output in phase with the rotor motion and a voltage 90° out of phase with the rotor motion.

Figure 5:
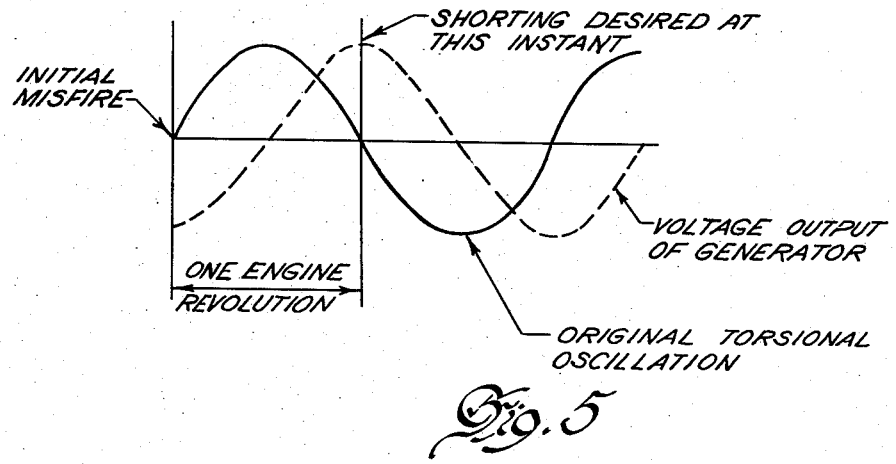
Figure 5 is a view similar to Figure 3 showing the phase relationship between the torsional oscillation of the system and the voltage output of the generator.

Figure 5 shows the relationship between the engine crankshaft and armature 31 oscillation and the voltage induced in the coil 33.

The output from the D.C. generator is fed through a capacitor 35 to the control gate of a commercially available silicon controlled rectifier 37 shown schematically in Figure 4. This type of semi-conductor device has the property of having a low resistance and the capability of passing large currents when its control gate has a predetermined voltage impressed on it but otherwise has a high resistance to current flow. Also as the name implies, it allows current to flow in one direction only. As shown, the rectifier is connected between the primary coil 3 and an ignition ground point 39.

If the D.C. generator is rotating at a varying speed, such as when the crankshaft is oscillating, the output will be a varying D.C. current and voltage such as that shown in Figure 4a. After passing this output through the capacitor 35 there will only be an A.C. voltage as shown in Figure 4b. The components of the system can be calibrated so that upon a predetermined voltage amplitude, corresponding to a predetermined oscillation amplitude of the engine shaft, the controlled rectifier will connect the primary coil to the ground point 39. Under this condition, even though the ignition points 5 open, the current from battery 1 will continue to flow through the primary coil 3 and there will be no voltage induced in the secondary to ignite the charge in the cylinder then supposed to fire.

Since the maximum oscillation of the crankshaft and armature 31 occurs one-half engine revolution later than the actual original point of misfire, and since the voltage peak from the D.C. generator occurs 90° or one-half engine revolution after the maximum crankshaft oscillation, the cylinder supposed to fire one revolution after the misfire will not be fired. This again will double the frequency of forcing vibration imposed on the drive shaft with the resulting decrease in oscillation of that member. The circuit of Figure 4 can be modified and other elements added to provide an adjustment of the degree of oscillation required to set the deliberate misfire. These elements form no part of the invention and the use and function thereof will be readily apparent to those skilled in the art.

Other electrical devices could be used to complete the connection between the primary winding of the ignition coil and the voltage source, in the illustrated example by connecting one end of the winding to the ignition ground. Examples of such devices are transistors that are utilized in switching circuits and which are responsive to a predetermined output from the D.C. generator to conduct electricity from the primary winding to the ignition ground.

It will be seen that the invention provides a simple method of preventing excesive torsional oscillations imposed on a drive shaft by a misfiring internal combustion engine. The invention is easily adaptable to all forms of vehicles and will function only when necessary, remaining a passive element during normal conditions.

Other modifications and examples will be apparent to those skilled in the art and the invention is not to be limited by the specific embodiments shown and described but is to be limited only by the following claims.

What is claimed is:

1. In an ignition control system for a multi-cylinder internal combustion engine having a crankshaft, a primary ignition circuit including a voltage source, a primary and a secondary ignition winding and a set of breaker points controlled in timed relationship to rotation of the engine crankshaft to connect and disconnect said source and said primary winding to induce a high voltage in the secondary winding, auxiliary means for at times connecting said source to said winding, said means responsive to a predetermined amplitude of torsional oscillation of the engine crankshaft to connect said primary winding and said source to render said breaker points ineffective to disconnect said source and said winding and thereby ineffective to induce the high voltage in said secondary winding.

2. In an ignition control system for a multi-cylinder internal combustion engine having a crankshaft, a primary ignition circuit including a voltage source, a primary and a secondary ignition winding and a first switch controlled in timed relationship to rotation of the engine crankshaft to connect and disconnect said source and said primary winding, to induce a high voltage in the secondary winding, auxiliary means for at times connecting said source to said winding, said means responsive to a predetermined amplitude of torsional oscillation of the engine crankshaft to connect said primary winding and said source to render said breaker points ineffective to disconnect said source and said winding and thereby ineffective to induce the high voltage in said secondary winding, said means including a torsional pendulum driven in timed relationship to the engine crankshaft and a second switch actuated by a predetermined amplitude of oscillation of said pendulum.

3. In an ignition control system for a multi-cylinder internal combustion engine, a primary ignition circuit including a voltage source, a primary and a secondary ignition winding and a set of breaker points controlled in timed relationship to rotation of the engine to connect and disconnect said source and said primary winding to induce a high voltage in the secondary winding, auxiliary means for at times connecting said source to said winding, said means responsive to a predetermined amplitude of torsional oscillation of the engine to connect said primary winding and said source to render said breaker points ineffective to disconnect said source and said winding and thereby ineffective to induce the high voltage in said secondary winding, said means including an electrical generator driven in timed relationship to the engine and having an output that varies with changes in the engine speed and conducting means responsive to a predetermined output from said generator for connecting said primary winding and said source.

4. The ignition control of claim 3 wherein said connecting means is a semi-conductor device completing the connection between said primary winding and said source and said generator output is connected to said semi-conductor device to change its current conducting characteristics upon a predetermined generator output.

5. A vibration limiting control for changing the frequency of forced vibrations imposed on a drive shaft driven by a multi-cylinder engine crankshaft, vibration sensing means responsive to a predetermined amplitude of torsional vibration of said engine, ignition control means for the engine, said ignition control including means for deliberately causing a misfire in said engine, said ignition control means connected to said sensing means and responsive upon a predetermined amplitude of torsional vibration of the engine to cause said misfire and thereby create a forced vibration on the engine crankshaft and drive shaft in such phase relationship to the predetermined vibration that the resulting frequency of oscillation is increased.

6. A vibration limiting control for changing the frequency of forced vibrations imposed on a drive shaft driven by a multi-cylinder engine crankshaft, said forced vibration of the type imposed on the shaft once every two engine revolutions, vibration sensing means responsive to a predetermined amplitude of torsional vibration of said engine, ignition control means for the engine, said ignition control including means for causing a misfire in said engine, said ignition control means connected to said sensing means and responsive upon a predetermined amplitude of torsional vibration of the engine to cause said misfire and thereby create a forced vibration on the engine crankshaft and drive shaft in such phase relationship to the predetermined vibration such that the resulting frequency of oscillation is increased, said vibration sensing means including a torsional pendulum driven in timed relationship to the engine and a switch activated by a predetermined amplitude of oscillation of said pendulum, said switch connected to said ignition control means to prevent the same from causing ignition in a cylinder normally ignited one engine revolution after the beginning of said torsional vibration.

7. A vibration limiting control for changing the frequency of forced torsional vibrations imposed on a drive shaft driven by a multi-cylinder engine crankshaft, said forced vibrations being of the type imposed on the shaft in timed relationship to rotation of the engine crankshaft, vibration sensing means responsive to a predetermined amplitude of torsional vibration of said engine, ignition control means for the engine, said ignition control including means for causing a misfire in said engine, said ignition control means connected to said sensing means and responsive upon a predetermined amplitude of torsional vibration of the engine to cause said misfire and thereby create a forced vibration on the engine crankshaft and drive shaft in such phase relationship to the predetermined vibration such that the resulting period of oscillation is increased, said vibration sensing means including an electrical generator driven in timed relationship to the engine and having an output that varies with engine speed, and means responsive to a predetermined rate of change in said generator output and connected to said ignition control means to cause a misfire in the engine in timed relationship to the original forced torsional vibration to thereby double the frequency of torsional vibration imposed on the drive shaft.

8. In an ignition control for a multi-cylinder internal combustion engine having a power shaft, ignition means for normally causing timed ignition in the cylinders of said engine in accordance with the rotation of the engine power shaft, means responsive to a predetermined rate of change of speed of the engine shaft and connected to and acting on said ignition means for preventing normal ignition in predetermined timed relationship to said rate of change of speed of the engine shaft.

9. A method for reducing the amplitude of vibration in a drive system caused by misfiring in one cylinder of a multi-cylinder internal combustion engine in the system, comprising detection of vibrations above a predetermined amplitude and causing a deliberate misfire of another cylinder substantially one engine revolution after the misfire in said one cylinder in response to detection of said vibrations above a predetermined amplitude.

10. A method for reducing the amplitude of vibration of a drive shaft caused by forced vibrations in an internal combustion engine connected to the drive shaft, and where the period of vibration occurs substantially at the natural frequency of vibration of the drive shaft, comprising the steps of detecting such vibration, deliberately changing the frequency of the forcing vibration by creating additional misfiring in the engine in such phase and period relationship to the original vibration that the forcing frequency will be a multiple of the natural frequency of the drive shaft.

11. A method of reducing the effect of vibrations imposed on a drive system at the natural frequency of a first member of the system by a second malfunctioning member of the system comprising the steps of first, detecting the vibrations in the system; second, deliberately creating an additional malfunction in the second member of the system in response to detection of vibrations; and third, phasing the additional ma'function with the original malfunction so that the total vibration caused by the original and additional malfunction and imposed on the system are not at the natural frequency of the first member of the system.

12. A method of reducing the effect of forced vibrations imposed on a shaft by misfire in a cylinder of an ignition controlled internal combustion engine connected to the shaft comprising first, detection of the vibration; second, at times deliberately rendering the normal ignition control for the engine inoperative to fire another cylinder in the engine in response to said detection; and third, phasing such deliberate misfire with the original misfire such that the forced vibration caused by both cylinders misfiring will be doubled over the original forced vibration.

References Cited in the file of this patent
UNITED STATES PATENTS

| | | |
|---|---|---|
| Re. 23,150 | Sexton | Sept. 20, 1949 |
| 1,267,962 | Bennett | May 28, 1918 |
| 1,278,119 | Dengler | Sept. 10, 1918 |
| 2,377,591 | Taylor | June 5, 1945 |
| 2,726,647 | Molyneux | Dec. 13, 1955 |
| 2,842,956 | Uyehara | July 15, 1958 |